US008854954B2

(12) United States Patent
Dunne et al.

(10) Patent No.: US 8,854,954 B2
(45) Date of Patent: *Oct. 7, 2014

(54) QUALITY OF SERVICE PREDICTION AND CALL FAILOVER

(75) Inventors: Jonathan Dunne, Waterford (IE); James Patrick Galvin, Jr., Georgetown, KY (US); David Malone, Maynooth (IE); Patrick Joseph O'Sullivan, Ballsbridge (IE)

(73) Assignee: International Businesss Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/454,380

(22) Filed: Apr. 24, 2012

(65) Prior Publication Data

US 2013/0279325 A1 Oct. 24, 2013

(51) Int. Cl.
*H04W 40/18* (2009.01)
*H04L 12/24* (2006.01)

(52) U.S. Cl.
USPC ............................ 370/228; 370/329; 370/351

(58) Field of Classification Search
CPC ... H04L 41/0663; H04L 69/40; H04L 45/302; H04L 65/80
USPC ......................................................... 370/228
See application file for complete search history.

(56) References Cited

U.S. PATENT DOCUMENTS

| 6,763,226 | B1 | 7/2004 | McZeal, Jr. | |
| 7,095,759 | B1 | 8/2006 | Fitzgerald | |
| 7,450,566 | B2 | 11/2008 | Wong | |
| 7,782,872 | B2 | 8/2010 | Rinne | |
| 2002/0193999 | A1 | 12/2002 | Keane et al. | |
| 2005/0281204 | A1* | 12/2005 | Karol et al. | 370/248 |
| 2008/0056241 | A1 | 3/2008 | Haddad et al. | |
| 2009/0125631 | A1* | 5/2009 | Blom et al. | 709/228 |
| 2010/0172251 | A1* | 7/2010 | Adam et al. | 370/252 |
| 2011/0007732 | A1 | 1/2011 | Ward et al. | |

OTHER PUBLICATIONS

Chen 'Short-time Traffic Flow Prediction with ARIMA-GARCH Model' 2011 IEEE Intelligent Vehicles Symposium (IV) Baden-Baden, Germany, Jun. 5-9, 2011.*
Anonymous, "PMI Based System and Method to Provide QOS in Enterprise Wide Unified Telephony Environment," http://priorartdatabase.com/IPCOM000210844, Sep. 12, 2011, pp. 1-3.
Anonymous, "Competitiveness Disclosure—System and Method to Motivate QOS in Unified Telephony Applications," http://priorartdatabase.com/IPCOM000209866, Aug. 18, 2011, pp. 1-4.

* cited by examiner

*Primary Examiner* — Donald Mills
*Assistant Examiner* — Henry Baron
(74) *Attorney, Agent, or Firm* — Holland & Knight LLP; Brian J. Colandreo, Esq.; Jeffrey T. Placker, Esq.

(57) ABSTRACT

A method, computer program product, and system for a quality-of-service history database is described. One or more characteristics of an electronic call are monitored. A current quality-of-service score is determined, based upon, at least in part, the one or more characteristics. A predicted quality-of-service score is determined based upon, at least in part, one or more of the current quality-of-service score and the one or more characteristics, wherein the predicted quality-of-service score is associated with one or more future times. A failover connection associated with the electronic call is provided. A current connection associated with the electronic call is replaced with the failover connection based upon, at least in part, one or more of the predicted quality-of-service score and a threshold quality-of-service score.

14 Claims, 5 Drawing Sheets

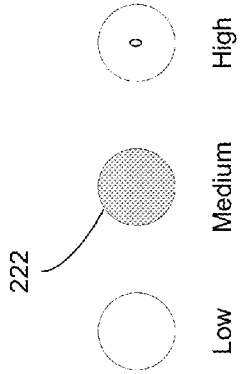
FIG. 4-a
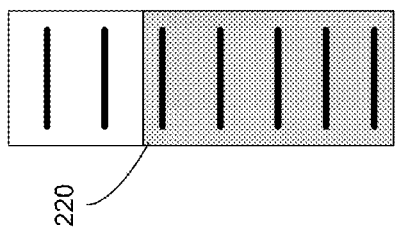
FIG. 4-b
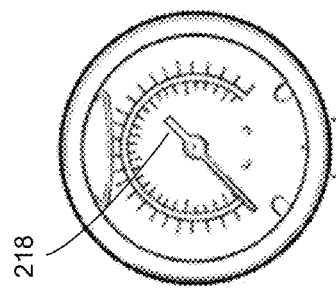
FIG. 4-c
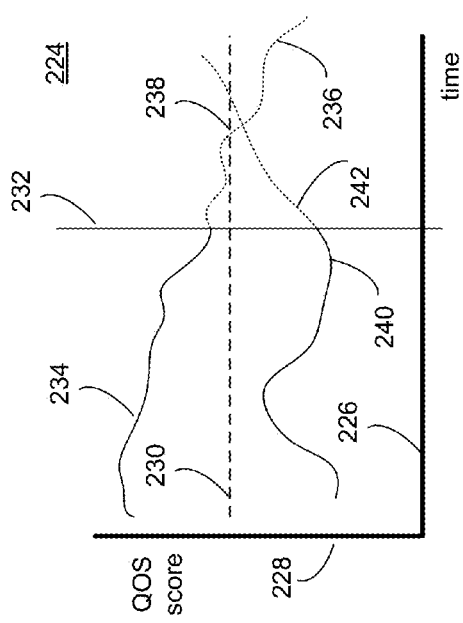
FIG. 4-d

QUALITY OF SERVICE PREDICTION AND CALL FAILOVER

TECHNICAL FIELD

This disclosure relates to electronic communication.

BACKGROUND

Participants in electronic calls of different types may sometimes experience quality-of-service issues resulting in a poor call experience. Quality-of-service issues may take various forms depending on the cause or causes of the issues, various characteristics of the affected call, and other factors. Various methods may be used to predict quality-of-service issues and to mitigate their effects.

BRIEF SUMMARY OF THE DISCLOSURE

According to a first aspect of the disclosure, a computer-implemented method includes monitoring, by one or more computing devices, one or more characteristics of an electronic call. The method also includes determining, by the one or more computing devices, a current quality-of-service score based upon, at least in part, the one or more characteristics. The method also includes determining, by the one or more computing devices, a predicted quality-of-service score based upon, at least in part, one or more of the current quality-of-service score and the one or more characteristics, wherein the predicted quality-of-service score is associated with one or more future times. The method further includes providing, by the one or more computing devices, a failover connection associated with the electronic call. The method further includes replacing, by the one or more computing devices, a current connection associated with the electronic call with the failover connection based upon, at least in part, one or more of the predicted quality-of-service score and a threshold quality-of-service score.

One or more of the following features may be included. Determining the predicted quality of service score may be based upon, at least in part, one or more of an autoregressive conditional heteroskedasticity analysis and an autoregressive integrated moving average analysis applied to a set of current quality-of-service scores. One or more of the current quality-of-service score and the predicted quality-of-service score may be associated with one or more of a participant associated with the electronic call and a set of call participants associated with the electronic call. The method may include providing to one or more of a participant associated with the electronic call and a moderator associated with the electronic call, by the one or more computing devices, a visual indicator associated with one or more of a set of current quality-of-service scores, and the predicted quality of service score. The visual indicator may include an alert associated with one or more of a likelihood of call failure and the failover connection. One or more of monitoring the one or more characteristics, determining the current quality-of-service score, determining the predicted quality-of-service score, providing the failover connection, and replacing the current connection with the failover connection may occur in near real-time. Providing the failover connection may be based upon, at least in part, an input from one or more of a participant associated with the electronic call and a moderator associated with the electronic call. Replacing the current connection with the failover connection may be based upon, at least in part, an input from one or more of a participant associated with the electronic call and a moderator associated with the electronic call.

According to another aspect of the disclosure, a computer program product resides on a computer readable storage medium and has a plurality of instructions stored on it. When executed by a processor, the instructions cause the processor to perform operations including monitoring one or more characteristics of an electronic call. Instructions may be included for determining current quality-of-service score based upon, at least in part, the one or more characteristics. Instructions are included for determining a predicted quality-of-service score based upon, at least in part, one or more of the current quality-of-service score and the one or more characteristics, wherein the predicted quality-of-service score is associated with one or more future times. Instructions are included for providing a failover connection associated with the electronic call. Instructions are also included for replacing a current connection associated with the electronic call with the failover connection based upon, at least in part, one or more of the predicted quality-of-service score and a threshold quality-of-service score.

One or more of the following features may be included. Determining the predicted quality of service score may be based upon, at least in part, one or more of an autoregressive conditional heteroskedasticity analysis and an autoregressive integrated moving average analysis applied to a set of current quality-of-service scores. One or more of the current quality-of-service score and the predicted quality-of-service score may be associated with one or more of a participant associated with the electronic call and a set of call participants associated with the electronic call. The plurality of instructions, when executed by the processor, may further cause the processor to perform operations including providing to one or more of a participant associated with the electronic call and a moderator associated with the electronic call a visual indicator associated with one or more of a set of current quality-of-service scores, and the predicted quality of service score. The visual indicator may include an alert associated with one or more of a likelihood of call failure and the failover connection. One or more of monitoring the one or more characteristics, determining the current quality-of-service score, determining the predicted quality-of-service score, providing the failover connection, and replacing the current connection with the failover connection may occur in near real-time. Providing the failover connection may be based upon, at least in part, an input from one or more of a participant associated with the electronic call and a moderator associated with the electronic call. Replacing the current connection with the failover connection may be based upon, at least in part, an input from one or more of a participant associated with the electronic call and a moderator associated with the electronic call.

According to another aspect of the disclosure, a computing system includes at least one processor and at least one memory architecture coupled with the at least one processor. The computing system also includes a first software module executable by the at least one processor and the at least one memory architecture, wherein the first software module is configured to monitor one or more characteristics of an electronic call. The computing system also includes a second software module executable by the at least one processor and the at least one memory architecture, wherein the second software module is configured to determine a current quality-of-service score based upon, at least in part, the one or more characteristics. The computing system further includes a third software module executable by the at least one processor and the at least one memory architecture, wherein the third software module is configured to determine a predicted quality-of-service score based upon, at least in part, one or more of the current quality-of-service score and the one or more characteristics, wherein the predicted quality-of-service score is associated with one or more future times. The computing system further includes a fourth software module executable by the at least one processor and the at least one memory architecture, wherein the fourth software module is configured to provide a failover connection associated with the electronic call. The computing system further includes a fifth software module executable by the at least one processor and the at least one memory architecture, wherein the fifth software module is configured to replace a current connection associated with the electronic call with the failover connection based upon, at least in part, one or more of the predicted quality-of-service score and a threshold quality-of-service score.

One or more of the following features may be included. Determining the predicted quality of service score may be based upon, at least in part, one or more of an autoregressive conditional heteroskedasticity analysis and an autoregressive integrated moving average analysis applied to a set of current quality-of-service scores. One or more of the current quality-of-service score and the predicted quality-of-service score may be associated with one or more of a participant associated with the electronic call and a set of call participants associated with the electronic call. The computing system may include a sixth software module executable by the at least one processor and the at least one memory architecture, wherein the sixth software module is configured to provide to one or more of a participant associated with the electronic call and a moderator associated with the electronic call a visual indicator associated with one or more of a set of current quality-of-service scores, and the predicted quality of service score. The visual indicator may include an alert associated with one or more of a likelihood of call failure and the failover connection. One or more of monitoring the one or more characteristics, determining the current quality-of-service score, determining the predicted quality-of-service score, providing the failover connection, and replacing the current connection with the failover connection may occur in near real-time. Providing the failover connection may be based upon, at least in part, an input from one or more of a participant associated with the electronic call and a moderator associated with the electronic call. Replacing the current connection with the failover connection may be based upon, at least in part, an input from one or more of a participant associated with the electronic call and a moderator associated with the electronic call.

According to another aspect of the disclosure, a computer-implemented method includes monitoring one or more characteristics of an electronic call. The method also includes determining, by the one or more computing devices, a first current quality-of-service score, associated with a first point in time, based upon, at least in part, the one or more characteristics. The method also includes determining a second current quality-of-service score, associated with a second point in time, based upon, at least in part, the one or more characteristics. The method also includes applying one or more of an autoregressive conditional heteroskedasticity analysis and an autoregressive integrated moving average analysis to a set of current quality-of-service scores including one or more of the first current quality-of-service score and the second current quality of service score. The method also includes determining a predicted quality-of-service score based upon, at least in part, the application of one or more of the autoregressive conditional heteroskedasticity analysis and the autoregressive integrated moving average analysis, wherein the predicted quality-of-service score is associated with one or more future times. The method also includes determining a likelihood of call failure based upon, at least in part, one or more of a quality-of-service threshold and the predicted quality-of-service score. The method also includes providing to one or more of a participant associated with the electronic call and a moderator associated with the electronic call a visual indicator associated with one or more of the likelihood of call failure, the first current quality-of-service score, the second quality-of-service score, and the predicted quality-of-service score.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 4-a through 4-d are diagrammatic views of aspects of implementations of the quality-of-service prediction and call failover process;

Like reference symbols in the various drawings indicate like elements.

DETAILED DESCRIPTION OF THE PREFERRED EMBODIMENTS

Figure 1:
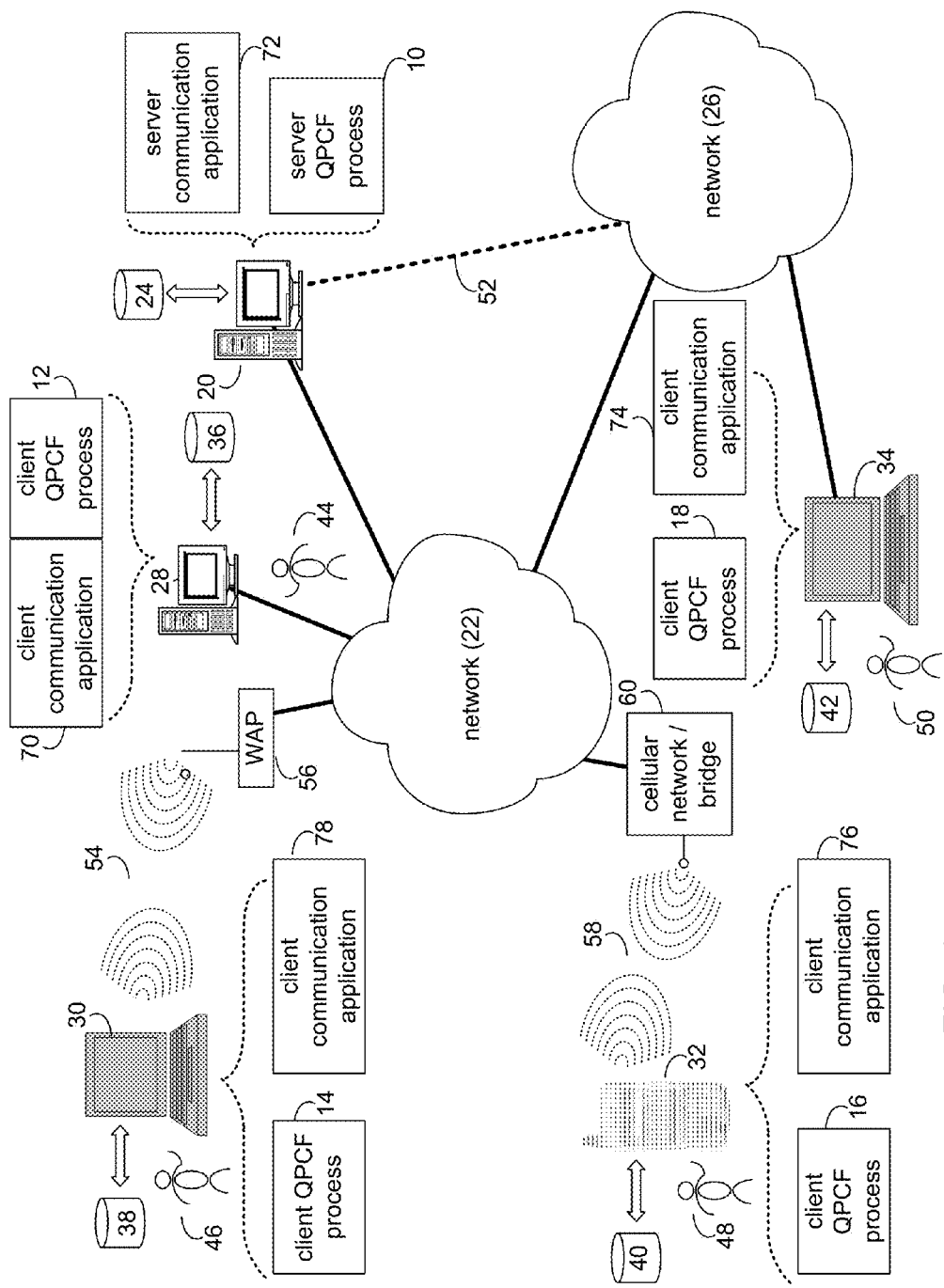
FIG. 1 is a diagrammatic view of a quality-of-service prediction and call failover process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It may be useful to both groups (e.g., business teams) and individuals, acting in professional and personal capacities, to communicate with other groups and individuals through electronic calls (or "calls"). Electronic calls may take a variety of forms, may include audio or video communication, and may be facilitated by a variety of communication applications. For example, individuals may participate in calls using cellular phones or fixed-line telephones. Individuals may also sometimes participate in calls using computers or computing devices, which may sometimes permit communication through video as well as audio means.

Referring now to FIG. 1, there is shown a QOS prediction and call failover (QPCF) process coupled to a distributed computing network. A QPCF process may be a server-side process, for example, server QPCF process 10. A QPCF process may also be a client-side process, for example, client QPCF process 12, client QPCF process 14, client QPCF process 16, or client QPCF process 18. A QPCF process may also be a hybrid server/client process, in which some or all of the functionality of the QPCF process is performed by the server and some or all of the functionality of the QPCF is performed by one or more clients. As an example, a hybrid server/client process may include the combination of server QPCF process 10 and one or more of client QPCF processes 12, 14, 16, and 18. Further, one or more of client QPCF processes 12, 14, 16, 18 and server QPCF process 10 may interface with each other (e.g., via network 22 and/or network 26).

Participants engaged in electronic calls and moderators associated with electronic calls may sometimes experience poor quality of service (QOS) associated with an ongoing call. Poor QOS may be indicated, for example, by imperfect transmission of audio or video information, by jitter, packet-loss, unacceptable latency, call failure or other phenomenon with adverse effects on actual (or perceived) call quality. Quality of service may be measured using a variety of methods and metrics. One example of such a metric is the family of industry standards known as the Perceptual Evaluation of Speech Quality (PESQ) standards. PESQ scores may indicated the quality of service (e.g., quality of transmitted speech) perceived by a participant in an electronic call. PESQ scores may be derived from various test methodologies included in the family of standards. Determination of PESQ scores may be automated to varying degrees.

Because QOS issues (i.e., episodes embodying poor QOS) may be detrimental to the success and efficiency of electronic calls, it may useful to predict future QOS and QOS issues (e.g., predicting future times with expected poor QOS). Prediction of QOS issues may provide participants and moderators with advance notice of impending degradation of call quality (or other QOS issues), thereby allowing remedial action to be taken, including, potentially, remedial measures that may be implemented so as to minimize the disruption to a call of the predicted quality of service issue. Remedial measures may include provision of an alternative communication channel (i.e., a failover connection) and they may be implemented automatically, in response to an input from a participant or moderator, or as a combination of these two methods.

Generally, therefore, in some embodiments, a QPCF process may monitor one or more characteristics of an electronic call. It may also determine a current quality-of-service score based upon, at least in part, the one or more characteristics, and a predicted quality-of-service score based upon, at least in part, one or more of the current quality-of-service score and the one or more characteristics, wherein the predicted quality-of-service score is associated with one or more future times. A QPCF process may also provide a failover connection associated with the electronic call and replace a current connection associated with the electronic call with the failover connection based upon, at least in part, one or more of the predicted quality-of-service score and a threshold quality-of-service score.

Server QPCF process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server QPCF process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server™, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; and Apache is a registered trademarks of Apache Software Foundation in the United States, other countries, or both.) Network 22 may be connected to one or more secondary networks (e.g., network 26), examples of which may include but are not limited to: a local area network; a wide area network; or an intranet, for example.

Client QPCF processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client QPCF processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In order to facilitate electronic calls, a communication application may operate on a client device (e.g., client communication application 78, operating on client electronic device 30; client communication application 70, operating on client electronic device 28; client communication application 74, operating on client electronic device 34; or client communication application 76, operating on client electronic device 32). A client QPCF process (e.g., client QPCF process 14) or a server QPCF process (e.g., server QPCF process 10) may be in communication with a client communication application (e.g., client communication application 78) or may be part of the client communication application.

A communication application may additionally or alternatively operate on a server device (e.g., server communication application 72, operating on server computer 20). A server QPCF process (e.g., server QPCF process 10) or a client QPCF process (e.g., client QPCF process 14) may be in communication with a server communication application (e.g., server communication application 72) or may be a part of the server communication application.

Electronic calls may be implemented via communication applications, for example, client communication application 70 or server communication application 72. Electronic calls may be implemented using traditional telephony principles or through the use of cellular towers or may be implemented using Internet Protocol (IP) methods, as in, for example, Voice over IP (VoIP) calls. VoIP refers to the general method of facilitating audio communication through the delivery of audio and audio-visual information over IP networks. VoIP may also be referred to as IP telephony, Internet telephony, Voice over Broadband (VoBB), broadband telephony, and broadband phone. VoIP may be implemented using a variety of communication and computing devices, including cellular phones and fixed-line telephones.

As noted above, in one implementation of an electronic call, audio and video communication between groups and individuals may be facilitated by unified telephony (UT) systems. UT sessions may allow two or more participants to communicate using a variety of devices, for example cellular phones, fixed line phones and computers or computing devices. Conventional UT servers may typically be deployed as part of a UT system and multiple servers may be implemented using both vertical and horizontal scaling. A UT server typically may provide audio and video capabilities to users that are configured on the server, permitting voice and video conferences across a plurality of users.

As an example of a UT system, a communication application such as Lotus Sametime® Unified Telephony may execute on server computer 20 as server communication application 72 (or on client electronic device 30 as client communication application 78). (Lotus and Sametime are trademarks of International Business Machines Corporation in the United States, other countries or both.) Lotus Sametime® Unified Telephony provides unified communications middleware which integrates telephony across multivendor Public Branch Exchange (PBS) systems and provides a unified end user experience, including integrated softphones, phone and IM presence awareness, and call management and control across multiple communications systems. UT technology may employ industry standard protocols such as Session Initiation Protocol (SIP) and other protocols defined by the Internet Engineering Task Force (IETF). (It will be understood that Lotus Sametime® Unified Telephony and other communication applications may operate additionally or alternatively as client communication applications, e.g., client communication application 70.)

Users 44, 46, 48, 50 (also variously referred to as "participants" or "moderators") may, for example, access server QPCF process 10 directly through the device on which the client process (e.g., client QPCF processes 12, 14, 16, 18) is executed, namely client electronic devices 28, 30, 32, 34. Users 44, 46, 48, 50 may access server QPCF process 10 directly through network 22 and/or through secondary network 26. Further, server computer 20 (i.e., the computer that executes server QPCF process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client QPCF process 12 will be described for illustrative purposes. It will be understood that client QPCF process 12 may, for example, be interact and/or communicate with server QPCF process 10 and/or may be executed within one or more applications that allow for communication with other server and/or client QPCF processes. This is not intended to be a limitation of this disclosure, as other configurations are possible (e.g., QPCR process 12 may include stand-alone client processes and/or stand-alone server processes.) For example, some implementations may include one or more of client QPCF processes 14, 16, 18 or server QPCF process 10 in place of or in addition to client QPCF process 12.

Figure 2:
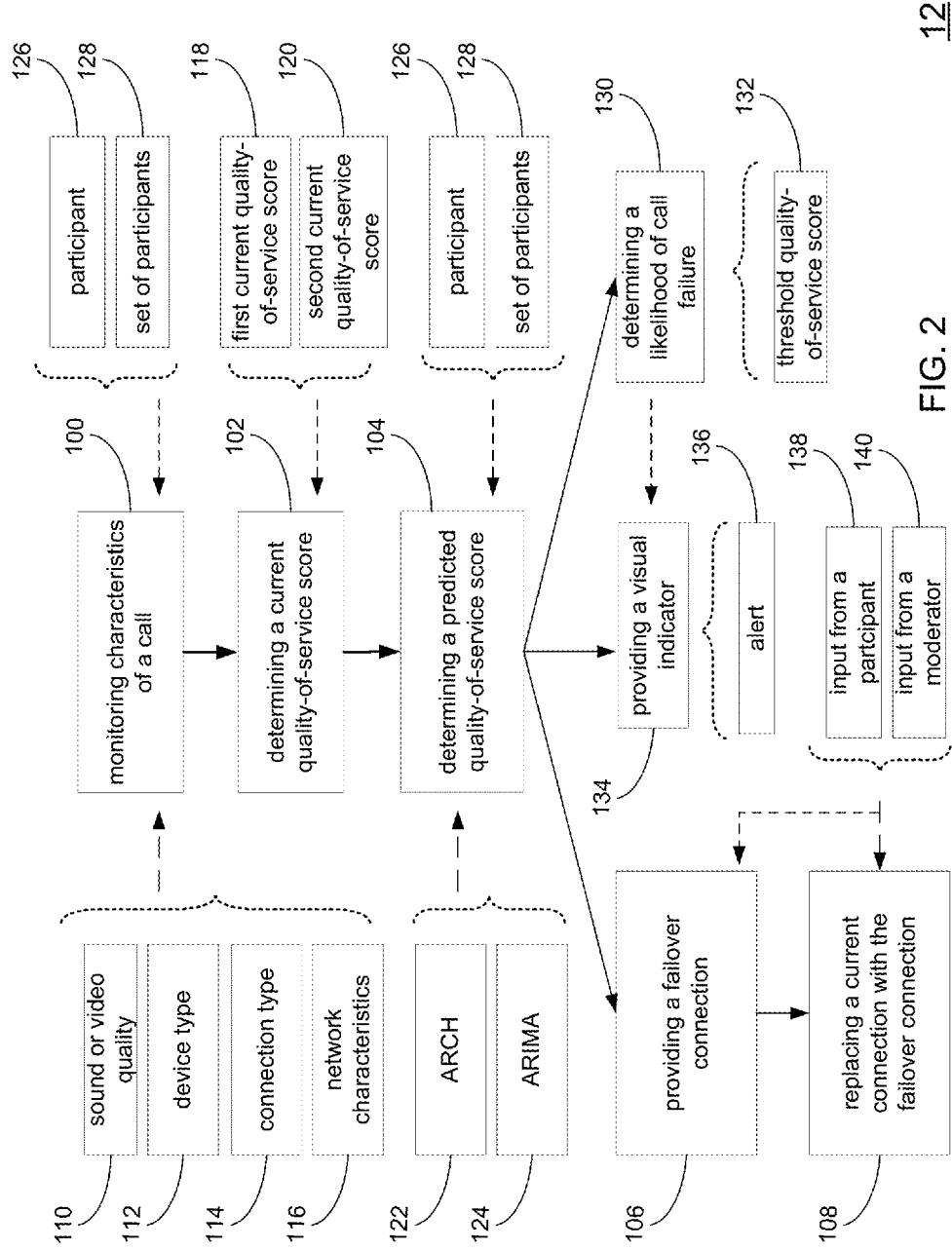
FIG. 2 is a flowchart of a process executed by the quality-of-service prediction and call failover process of FIG. 1.

Referring now also to FIG. 2, there is shown a diagrammatic view of a process implemented by a QPCF process, e.g., client QPCF process 12. Client QPCF process 12 may monitor 100 one or more characteristics of an electronic call. The monitored characteristics may include a variety of information associated with a participant associated with an electronic call, a moderator associated with an electronic call or other aspects of an electronic call. (It will be understood that examples referring to "participants" may also be applicable to "moderators" and that moderators may also be participants.) For example, monitoring 100 one or more characteristics of an electronic call may include monitoring 110 sound or video quality sent or received by a call participant. Monitoring 100 one or more characteristics may also include monitoring 112 information associated with a device type. For example, client QPCF process 12 may monitor 112 the type of device a participant is using and various information about that device, including, for example, the type of connection (e.g., cellular phone connection, land-line, IP-based) and the hardware and software characteristics of the device. Monitoring 100 one or more characteristics of an electronic call may be performed in real-time or near real-time (as may other aspects of a QPCF process).

Monitoring 100 one or more characteristics may also including monitoring 114 information associated with connection types associated with one or more participants or moderators. Monitoring 114 connection type may include, for example, monitoring whether a broadband, cellular or other connection is being employed by a participant for the electronic call. Monitoring 100 one or more characteristics may also include monitoring 116 network characteristics, including, for example, bandwidth and network load. Network characteristics may also relate to network outage or capacity information, including information relating to network over-load conditions, as well as to possible (and actual) connection type, such as whether a network is a broadband network, a cellular network, a mixed network, a private network, etc Monitoring 100 the one or more characteristics may be accomplished through a variety of means and may include receipt of data via various communication channels (also sometimes referred to as "connections") including via the routing of data through one or more servers or other network hardware. Certain information associated with the one or more characteristics (e.g., sound and/or video quality, device type, connection type, and/or network characteristics) may be stored locally to one or more computing devices associated with one or more participants and/or moderators (e.g., client electronic devices 28, 30, 32, 34). In an example embodiment, QPCF process 12 may, for example, monitor 100 characteristics associated with participant 44 by receiving information associated with one or more characteristics of a call from personal computer 28 (or associated local storage, such as, for example, storage device 36) via, for example, a network interface device. Similarly, QPCF process 12 may, for example, monitor 100 characteristics associated with participants 46, 48 and 50 by receiving information associated with those characteristics from laptop computer 30, a data-enabled mobile telephone 32, and notebook computer 34, respectively (or associated local storage, such as, for example, storage device 42). Alternatively, information associated with the one or more characteristics may be stored remotely from participants in a remote storage device (not shown). In such an embodiment, QPCF process 12 may monitor 100 characteristic by receiving information associated with the characteristics from a remote storage device.

It will be understood that information associated with the monitored characteristics (as with any information associated with a QPCF process) may, for example, be stored by QPCF process 12 in a local storage device (e.g., storage device 36) or a remote storage device (not shown), in order to allow historical information associated with the monitored characteristics to be accessed by QPCF process 12 and/or another process.

QPCF process 12 may further determine 102 a current QOS score based upon, at least in part, the one or more monitored 100 characteristics. Determining 102 a current QOS score may be based upon, for example, determining 102 an industry QOS score such as a Perceptual Evaluation of Speech Quality (PESQ) score. As noted above, PESQ refers to test methodology standards for assessment of call quality, which may be implemented in an automated manner. Determining 102 a current QOS score may include, therefore, determining (or receiving) a PESQ score associated with a call or call participant and/or determining (or receiving) information associated with a PESQ score. It will be understood, however, that QOS scores are not limited to PESQ scores. For example, a QOS score may also include, for example, other assessments of QOS based on industry standards or other factors.

In various embodiments, determining 102 current QOS score may include determining 126 a current QOS score associated with a participant, determining 128 a current QOS score associated with a set of participants, determining a current QOS score associated with a moderator (not shown) and/or a set of moderators (not shown). For example, QPCF process 12 may determine a current QOS score associated with participant 44, with moderator 50 or with a set of participants and moderators representing a portion (or all) of the participants and moderators associated with the electronic call. In this way, QPCF process 12 may determine a current QOS score associated with individuals, with groups, and with the electronic call as a whole. In some embodiments, determining 102 a current QOS score associated with the electronic call as a whole may be particularly useful, for example, where the electronic call is a large conference-call such that aggregate QOS scores may be important as well as QOS scores associated with individuals.

Determining 102 a current QOS score may include determining multiple current QOS scores. For example, referring now also to FIG. 3, users 44, 46 and 48 may be participants in electronic call 82. QPCF process 12 may, for example, determine 102 a current QOS score for each of the participants. Similarly, QPCF process 12 may determine 118, for a given participant (e.g., participant 44) a first current QOS score at a first time and may determine 120 a second current QOS score at a second time.

The determined current QOS score (or scores) and associated information may be stored by QPCF process 12 in a local storage device (e.g., storage device 36) or a remote storage device (not shown). According to such an embodiment, QPCF process 12 and/or another process may access previously-determined current QOS scores (i.e., current QOS scores associated with past times) as required. Accessing previously-determined current QOS scores may be useful, for example, in applying statistical or other analysis techniques to a series of QOS scores corresponding to a series of time intervals, which may provide the ability to predict future QOS trends.

QPCF process 12 may further determine 104 a predicted QOS score associated with one or more future times. Determining 104 a predicted QOS score may be based upon, at least in part, one or more of a current QOS score and the one or more monitored characteristic. For example, patterns or other aspects of one or more previously determined QOS scores (e.g., determined 118 first current QOS score and determined 120 second current QOS score) and/or other monitored 100 characteristics (e.g., sound quality or network load) may facilitate prediction of a probable QOS score for one or more future times. Such a predicted QOS score may, for example, usefully assist call participants and/or moderators in anticipating future QOS issues and/or potential call interruption and/or failure. A predicted QOS score may be determined 126 associated with a participant, determined 128 associated with a set of participants, a moderator (not shown), or a set of moderators (not shown).

It will be understood that it may be useful to determine 104 multiple predicted QOS scores associated with multiple future times, in order to achieve a more complete picture of possible QOS issues. It will also be understood that a QPCF process may predict one or more QOS scores up to a specified future time, based on participant and/or moderator input, available resources and/.or other considerations. For example, it may be determined that the most practical (or accurate) interval of time over which a QPCF process may predict QOS reaches 10 minutes into the future. The interval of time, as noted, may be set by a participant and/or moderator and/or based on other inputs or processes. As such, QPCF process 12 may determine 104 predicted QOS scores reaching only 10 minutes into the future, consistent with the foregoing example.

In order to determine 104 a predicted QOS score, various statistical analyses may be applied (alone or in combination) to one or more current QOS scores or monitored characteristics. For example, QPCF process 12 may employ 122 Autoregressive Conditional Heteroskedasticity (ARCH) analysis. ARCH analysis may be useful for characterizing and modeling time series data, particularly when series terms are expected to exhibit characteristic sizes or variance. ARCH analysis may take many forms, including Generalized Autoregressive Conditional Heteroskedasticity (GARCH), Nonlinear Generalized Autoregressive Conditional Heteroskedasticity (NGARCH), Integrated Generalized Autoregressive Conditional Heteroskedasticity (IGARCH), etc. GARCH analysis may be implemented, for example, where an autoregressive moving average model is assumed for the time series error variance.

According to another example, QPCF process 12 may employ 124 an Autoregressive Integrated Moving Average (ARIMA), which may include another analysis technique that may be useful for characterizing and modeling time series data. Various implementations of an ARIMA analysis are also possible, including, for example, Vector Autoregressive Integrated Moving Average (VARIMA), Fractional Autoregressive Integrated Moving Average (FARIMA), and Seasonal Autoregressive Integrated Moving Average (SARIMA).

QPCF process 12 may further determine 130 a likelihood of call failure. A likelihood of call failure may indicate the possibility that a call will fail due to QOS (or other) issues within a given time interval. The likelihood may, for example, take the form of a precise probability (e.g., 27% chance of call failure in the next 5 minutes), may take the form of generalized probability (e.g., high/low/average chance of call failure in the next 30 seconds), or may take the form of a comparative condition (e.g., predicted QOS falls below a threshold value). The likelihood may be associated with one or more participants, moderators and sets of moderators and participants (including, e.g., the entire participant/moderator set associated with the call). The likelihood may relate to various future time intervals, which may be determined automatically or by way of input from a call participant or moderator.

In one embodiment, the likelihood of call failure may be determined 130 based upon one or more predicted QOS scores. For example, QPCF process 12 may employ various statistical analyses (e.g., ARIMA or GARCH analyses) to determine 104 a predicted QOS score based upon one or more current QOS scores (including, for example, multiple current QOS scores associated with a participant for multiple times). The predicted QOS score may then form a basis for determining 130 a likelihood of call failure by, for example, comparing 132 the predicted QOS score with a pre-determined (or participant-entered) threshold QOS score. For example, the likelihood of call failure may be determined from past calls, in which a certain predicted QOS score (i.e., a threshold QOS score) may have generally resulted in call failure. As such, a high likelihood of call failure for a later call may be determined 130 based upon a predicted QOS score for the call falling below a threshold QOS score. It will be understood that a threshold QOS score may be determined from analysis of past data, through input from a participant or moderator, or through various other means.

As an example, QPCF process 12 may have determined participant Emilio's current QOS score at regular 13 second intervals during a 60 minute call. QPCF process 12 may apply a statistical technique such as GARCH analysis to determine predicted QOS scores associated with ten 30-second intervals reaching five minutes into the future. The statistical analysis of Emilio's QOS scores may predict that around 3 minutes and 30 seconds into the future, Emilio's predicted QOS score will fall below the QOS score Emilio has indicated as acceptable for his current mode of communication (e.g., a cellular phone). As such, QPCF process 12 may determine a likelihood of call failure around 3 minutes and 30 seconds into the future.

QPCF process 12 may further provide 106 a failover connection associated with the electronic call. QOS issues, as may be indicated, for example, by a low QOS score, may have detrimental effects on a participant's call experience including, for example, the inability to hear other participants clearly, the inability to see video clearly, or call failure (i.e., disconnection of one or more participants from the call). In order to prevent or mitigate these and other effects, it may be desirable to replace a current call connection (e.g., a land-line connection, a cellular connection, a broadband connection, etc.) with an alternative "failover" connection. This failover connection may include a connection of the same or different type of connection as existing call connections and/or multiple failover connections may be provided for a given call or call participant. In one embodiment, for example, QPCF process 12 may determine a low predicted QOS for a participant using a cellular telephone. Based on default parameters or information from moderators, participants or other processes, this low predicted QOS score for a cellular telephone may prompt QPCF process 12 to provide a landline-based failover connection. This may be desirable, for example, if the source of a QOS issue is cellular reception. In such a case, providing a cellular failover connection may not be optimal, while providing a landline-based failover connection may remedy/mitigate the QOS issues associated with the cellular reception.

In certain instances, QPCF process 12 may provide 106 a failover connection based upon a predetermined list of connections, which may have been created by a participant or moderator or may have been generated automatically based upon, for example, LDAP information (e.g., which may include a list of all call devices associated with a participant) and/or other data. QPCF process 12 may also, however, provide 106 a failover connection based upon an input from a participant and/or a moderator associated with the electronic call (e.g., received 138 input from a participant and received 140 input from a moderator). For example, upon determining 102 a predicted QOS score that indicates a likelihood of call failure associated with a particular participant, QPCF process 12 may prompt the affected participant to input an appropriate failover connection and/or select an appropriate failover connection (or order of failover connections) from a predetermined list of connections.

Returning to the previous example, participant Emilio may have created a profile associated with QPCF process 12 that lists his preferred order of failover devices. For example, Emilio may have indicated that his office phone should be the first preferred failover connection during business hours, followed by his cellular phone and then his home phone. Alternatively, QPCF process 12 may receive information associated with LDAP entries, which indicates a primary phone number corresponding to Emilio's business phone and a secondary phone number corresponding to his cellular phone. QPCF process 12 may accordingly preferentially provide Emilio's business phone as a failover connection, followed by his cellular phone. As yet another example, if QPCF process 12 determines an elevated likelihood of call failure for Emilio, QPCF process 12 may prompt Emilio to select from among a list of possible failover connections or to enter custom failover connection information. Providing a prompt to select a failover connection from a list of possible failover connections may be useful, for example, if Emilio is visiting an off-site office. Emilio would be able to commence a call on his regular cellular phone, and then provide a phone number for the off-site office as a failover connection, if necessary. It will be understood that the list of user provided failover connection information may be stored by QPCF in order to facilitate determining appropriate failover connections for Emilio's future calls.

QPCF process 12 may also replace 108 a current connection associated with the electronic call with a failover connection. Current connection, in this context, refers to a communication channel (e.g., a landline, cellphone link, etc.) that permits a participant or moderator to send and receive information associated with a call. A current connection may be associated with one or more participants or moderators associated with the call.

Replacing 108 the current connection may be based upon, for example, the predicted QOS score and a threshold QOS score. For example, it may be determined from past calls (or other sources) that a certain predicted QOS score (i.e., a threshold QOS score) generally results in call failure (and/or unacceptable call experience). As such, if a predicted QOS score for a participant falls below the threshold QOS score (or is otherwise determined to be unacceptable) QPCF process 12 may replace 108 a current connection associated with the participant with a failover connection. In this way execution of QPCF process 12 may avert and/or mitigate the predicted QOS issues. It will be understood that a threshold QOS score may be determined from analysis of past data, through input from a participant or moderator, or through various other means.

Replacing 108 a current connection with a failover connection may also be based upon a received 138 input from a participant and/or a received 140 input from a moderator. For example, QPCF process 12 may automatically replace 108 a current connection with a failover connection in response to detection of specific conditions (e.g., a predicted QOS score falls below a threshold QOS score). Alternatively, QPCF process 12 may replace 108 the current connection with the failover connection based on a received 138, 140 input requesting such replacement.

For example, upon determining 104 a predicted QOS score for UT call participant Zora and providing 106 a failover connection, QPCF process 12 may prompt Zora to decide whether her current connection should be replaced with a failover connection, in light of the predicted QOS score. Zora, in this instance, may be provided with additional information in order to facilitate her input, including, for example, the predicted QOS score, one or more current QOS scores, and a threshold QOS score. If Zora accepts the failover connection (e.g., by providing an input indicating acceptance), in response to receiving 138 the input from Zora QPCF process 12 may replace 108 Zora's current connection with the failover connection. Replacing 108 the connection may include communicating with the UT communication application and/or other applications or network equipment in order to prompt the re-routing of call data associated Zora from the current connection to the failover connection.

Zora may have, for example, been participating in a call using her office phone, but electrical interference may have caused degradation of the office phone connection. QPCF process 12 may determine 104 predicted QOS scores below a threshold QOS score and accordingly prompt Zora that a failover is recommended. Wishing to continue the call, Zora may select (or have pre-selected) her cellular phone as a failover connection. Accordingly, while Zora is still engaged in the call on her office phone, Zora's cellular phone may ring. Zora may then pick up her cellular phone and continue the call via that device. It is also possible that a failover connection may replace 108 a current connection after the current connection has been terminated. For example, although Zora's connection via the office phone may have been terminated before a failover connection was established, QPCF process 12 may still replace 108 the terminated current connection with the failover connection, thereby allowing Zora to continue (and/or rejoin) her call.

In some embodiments, QPCF process 12 may also provide Zora with an option to override the replacement of her current connection with a failover connection. In such an embodiment, a participant input may be received by QPCF process 12, and may cause QPCF process 12 to not replace the current connection (or not to replace the current connection with the provided failover connection). For example, if Zora has been alerted that call failure is likely 3 minutes into the future but completing her call will require only 40 seconds, Zora may choose not to use a failover connection and to terminate the call as planned.

It may be useful to participants and moderators of a call to have access to information associated with QOS and QOS scores. As such, client QPCF process 12 may also provide 134 a visual indicator associated with one or more of a set of current QOS scores and a predicted QOS score. It will be understood that a set of QOS scores may include one or more scores and that a set of QOS scores may associated with the provided indicator. QPCF process 12 may, for example, provide to a participant a visual representation of all current QOS scores associated with that participant. QPCF process 12 may also, as a further example, provide to a participant a visual representation of one or more predicted QOS scores, and one or more threshold QOS scores.

It will be understood that a visual indicator need not include information associated with a participant or moderator to whom it is provided and may include information associated with other participants and/or moderators. For example, if Amelie, Pablo and Steve are participants in a call, QPCF process 12 may provide Pablo with a visual indicator representing his own QOS scores as well as those of Amelie and Steve. This may be useful, for example, if Pablo is receiving reports from Amelie and Steve and does not want to miss information due to QOS issues.

The visual indicator provided 134 by QPCF process 12 may include an alert 136 associated with a likelihood of call failure or a failover connection. For example, if it is determined that call failure (or another serious QOS problem) is likely, QPCF process 12 may provide a related alert to as part of a visual indicator. In one embodiment, a visual indicator may include a text alert that call failure is likely or imminent. In another embodiment an alert may employ flashing colors (or various other means) in order to obtain a participant's attention. An alert may also include information associated with a failover connection. For example, a visual indicator may include an alert notifying a participant that call failure is likely in the next 5 minutes and prompting the participant to select a failover connection from a list, to an alternative failover connection information, or even to cancel the use of a failover.

Figure 3:
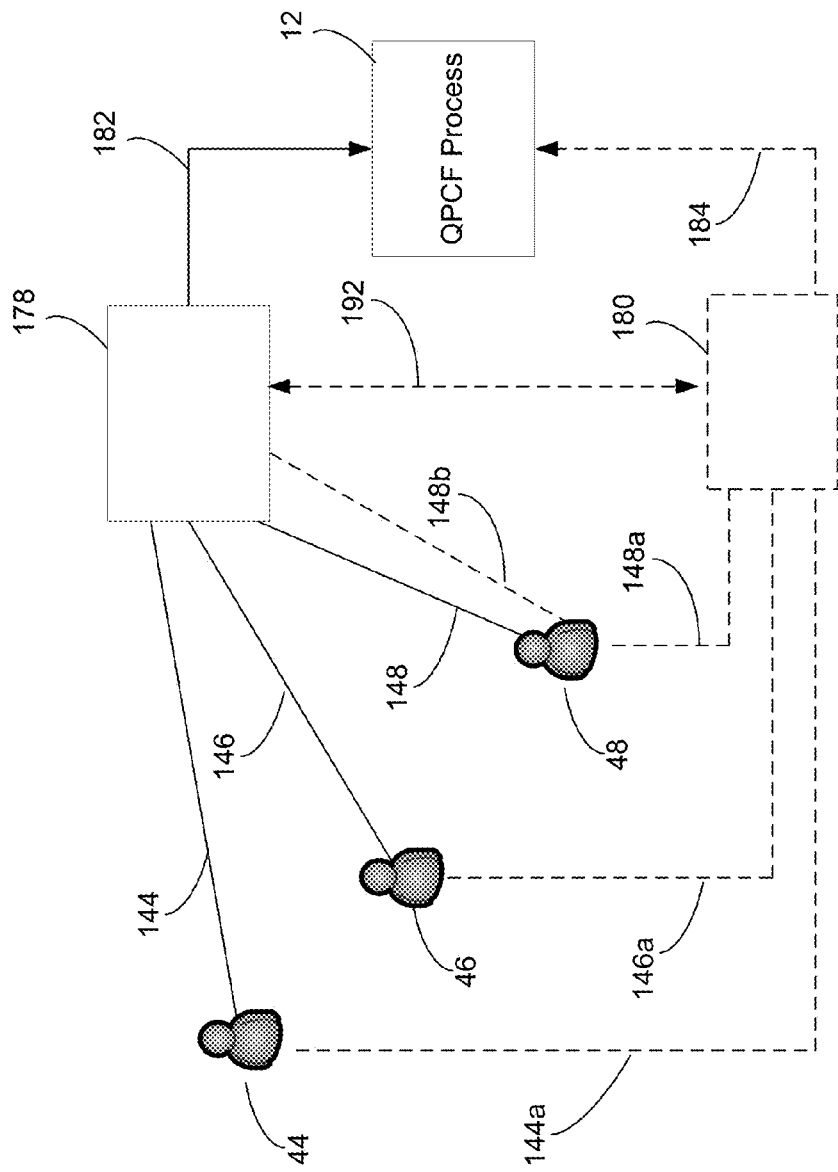
FIG. 3 is a diagrammatic view of an aspect of an implementation of the quality-of-service prediction and call failover process.

Referring now also to FIG. 3, an example implementation of QPCF process 12 for electronic call 82 is represented. Call 82 may, for example, include participants 44, 46 and 48, who may be using a variety of device types, including cellular phones, fixed-line phones, computers and VoIP capable devices. It will be understood here, as elsewhere in this disclosure, that multiple devices may be associated with a particular participant or multiple participants with a single device. Communication among the participants may be facilitated with a variety of network connections and configurations. For example, participants may potentially communicate via unified telephony server 178, using communication channels 144, 146 and 148, or may communicate via device 180 (which may be a different server, e.g., sever computer 20, a cell tower or bridge, e.g., cellular network/bridge 60, a wireless network router, e.g., WAP 56, etc.), using alternate communication channels 144a, 146a and 148a. (It will be understood that various network and connection configurations not described herein may be possible and that various network hardware may connect to other network hardware as well as to participants and moderators, as indicted, for example, by connection 192.)

In call 82, client QPCF process 12 may monitor 100 characteristics associated with the call, including monitoring 110 sound of video quality, monitoring 112 device types, monitoring 114 connection types, and/or monitoring 116 network characteristics. Based on these characteristics, QPCF may determine 102 multiple current QOS scores for each participant, associated respectively with various different times or time intervals. For example, for a call lasting from 1:00 PM until 2:00 PM client QPCF process 12 may determine a current QOS score for each participant at intervals of two minutes for the entire call duration—e.g., 1:02 PM, 1:04 PM, etc. It is also possible, for example, that QPCF process 12 may determine a current QOS score at different or varying intervals or even irregularly—e.g., in response to detecting a QOS issue associated with one of the participants.

Having determined a set of current QOS scores (e.g., a current QOS score for 1:02 PM, 1:04 PM, etc.), QPCF process 12 may apply 122, 124 ARCH or ARIMA analysis to the set in order to determine 104 a predicted QOS score. It will be understood that a predicted QOS score may be associated with a single participant or with a set or participants and may relate to various future times or time intervals. For example, the predicted QOS score time interval (i.e., how far into the future the predicted QOS score falls) may be set to a default time before or during execution of QPCF process 12 or may be determined based upon input from a participant or moderator.

It will also be understood that multiple predicted QOS scores may be determined 104, based, for example, upon different sets of current QOS scores. For example, a QPCF process may use a relatively small set of current QOS scores to determine predicted QOS scores for the near future, but a relatively large set of current QOS scores to determine a predicted QOS score farther into the future. Determining 104 multiple predicted QOS scores for various future time intervals (e.g., a predicted QOS score for 1 minute, 5 minutes, 10 minutes and 20 minutes into the future) may be useful as this may provide participants or moderators with more specific and detailed predictive information and thereby permit optimal remediation of potential QOS issues. It will be recognized that, in some embodiments, predicted QOS scores for points farther into the future may be less accurate that predicted QOS scores for points nearer to the present. It will also be recognized that, in some situations, predicted QOS scores may indicate that no QOS issues are expected, or that a QOS issue is expected to stem from only a short dip in QOS score. In these latter cases, use of a failover connection may not therefore be required.

In call 82, participant 48 is represented as being connected to the call (i.e., being able to communicate with the other participants) via connection 148. Because participant 48 is using a cellular device (e.g., data-enabled mobile telephone 32), however, connection 148 may be a cellular connection and therefore be susceptible to certain QOS issues. As further depicted in FIG. 3, participant 48 may also be associated with connections 148*a* and 148*b*, which may represent, for example, an alternate cellular phone connection (148*b*) and a land-line broadband connection (148*a*).

Based upon predicted QOS scores, QPCF process 12 may determine that call failure (or another negative QOS issue) may be likely for participant 48 and that, therefore, it may be necessary to replace 108 the current connection 148 associated with participant 48 with a failover connection. In order to facilitate this replacement, QPCF process 12 may provide 106 alternative connections 148*a* and 148*b* as failover connections. QPCF process may also provide 134 a related visual indicator to participant 48. This visual indicator may include, for example, representation of various current QOS scores (including scores associated with participant 48), representation of various predicted QOS scores (including scores associated with participant 48), representation of the likelihood of call failure, requests for input regarding a failover connection, and various other information.

QPCF process 12 may also replace 108 current connection 148 associated with user 48 with failover connection 148*a* or 148*b*. The selection of a particular failover connection, as noted above, may be automatic or may be based on input from a participant (e.g., participant 48) or a moderator. The selection of a particular failover connection may also be based upon other information or rules. For example, it may be determined that cellular connections are particularly unreliable for participant 48, or when associated with a particular time, place, or type of call. As such, QPCF process 12 may in some instances preferably replace current connection 148 with failover connection 148*a* (a land-line broadband connection) instead of failover connection 148*b* (a cellular connection).

Referring also now to FIG. 4-*a* through 4-*d*, QPCF process 12 may provide 134 various types of visual indicators. For example, a visual indicator may include a representation of a dial-type indicator as in FIG. 4-*a*, in which needle 218 rotates to indicate a current or predicted QOS score. For example, needle 218 being fully rotated in the counter-clockwise direction may indicate a high current QOS score. As another example, a visual indicator may include representation of a level gauge as in FIG. 4-*b*, in which level 220 may be raised or lowered to indicate a current or predicted QOS score. As yet another example, a visual indicator may include a representation of an indicator panel as in FIG. 4-*c*, in which a current or predicted QOS score may be indicated by shading or coloring a particular shape or icon. In this case, for example, shading of shape 222 may indicate an average QOS score.

In another embodiment, as depicted in FIG. 4-*d*, a visual indicator may include a rolling graph 224 of current and predicted QOS scores. This may be possible, for example, if a QPCF process is continually monitoring call characteristics and has determined 102 one or more current QOS scores and 104 one or more predicted QOS scores. Rolling graph 224 may include, for example a horizontal time axis 226, corresponding to the point in time associated with a particular QOS score (current or predicted), and a vertical QOS axis 228, corresponding to the determined current and predicted QOS scores. Vertical line 232 may indicate the present time, with data 234 plotted to the left of line 232 (i.e., data associated with the past) representing previously determined current QOS scores and data 236 plotted to the right of line 232 (i.e., data associated with the future) representing predicted QOS scores. A threshold QOS score 132 may also be indicated by, for example, horizontal line 230. In this way, a participant or moderator may determine not only whether call failure (or other QOS issue) is likely, but also the point in time 238 when that problem is likely to occur (i.e., the time at which predicted QOS score falls below the threshold QOS score on rolling graph 224).

It will be understood that multiple trendlines may be plotted on rolling graph 224 (as well as on other types of visual indicators). For example, the QOS scores represented by line segments 234 and 236 may be associated with participant 48, whereas the QOS scores represented by line segments 240 and 242 may be associated with participant 46 (or, for example, with the call as a whole). It will also be understood that rolling graph 224 (as with other visual indicators) may be updated periodically or continually so as to display the current information, thereby causing the QOS trendlines (e.g., line segments 234, 238, 240 and 242) to "roll" across the graph from right to left.

Figure 5:
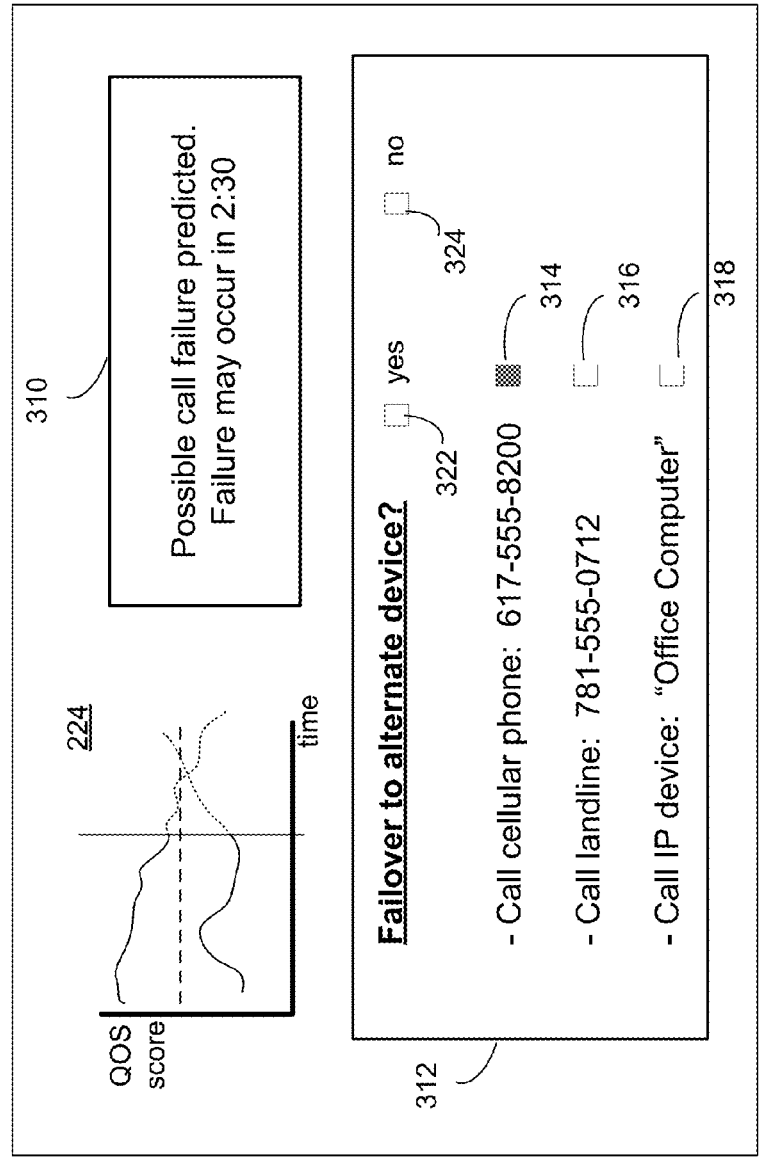
FIG. 5 is a diagrammatic view of an aspect of an implementation of the quality-of-service prediction and call failover process.

Referring now also to FIG. 5, the visual indicator provided 134 by QPCF process 12 may include an alert 136. For example, visual indicator 300 is depicted as including rolling graph 224 as well as alerts 310 and 312. Alert 310, for example, provides a warning that a possible call failure has been predicted (e.g., based on comparison of a predicted QOS score with a threshold QOS score) as well as an indicator that the failure may occur in the next 2 minutes and 30 seconds. Alert 312, as another example, indicates that a failover is recommended and provides a list of options for selecting a preferred failover connection. In example alert 312, a participant is provided with a option of whether to failover to an alternate device, via input boxes 322 and 324. The participant is also offered a choice, should she decide to use a failover connection, between a cellular phone 314, a landline 316 or a connection 318 associated with an "office computer." In this case, the cellular phone option has been pre-selected by default.

It will be understood that device/connection lists of the kind depicted in FIG. 5 may be populated through a variety of means including input from participants or moderators (whether prior to a call or as part of call initiation/operation) or based on various data sources (e.g., directory information databases). Additionally, it will be understood that alerts 136 may contain more or less functionality in various circumstances. For example, instead of the options represented in FIG. 5, alert 312 may offer only a yes-no dialog regarding whether a participant wishes to use any failover connection or may offer only the information that a failover connection is about to be (or was just) used. Alternatively, alert 312 may permit a participant to input a preferred order for failover connections and to save this preference (and others) for use by a QPCF process at a later time. It will be understood that various other types of alerts, including alerts not containing text, may be possible.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer-readable storage medium having a plurality of instructions stored thereon, which, when executed by a processor, cause the processor to perform operations comprising:
monitoring one or more characteristics of an electronic call;
determining a current quality-of-service score based upon, at least in part, the one or more characteristics;
storing the current quality-of-service score in a storage device as a previously-determined current quality-of-service score;
determining a predicted quality-of-service score based upon, at least in part, one or more of the previously-determined current quality-of-service scores, the current quality-of-service score, and the one or more characteristics, wherein the predicted quality-of-service score is associated with one or more future times;
providing to one or more of a participant associated with the electronic call and a moderator associated with the electronic call a visual indicator associated with one or more of a set of current quality-of-service scores, the predicted quality-of-service score, and whether the predicted quality-of-service score falls beneath a threshold quality-of-service score;
providing a failover connection associated with the electronic call; and
replacing a current connection associated with the electronic call with the failover connection based upon, at least in part, one or more of the predicted quality-of-service score and the threshold quality-of-service score.

2. The computer program product of claim 1 wherein determining the predicted quality of service score is based upon, at least in part, one or more of an autoregressive conditional heteroskedasticity analysis and an autoregressive integrated moving average analysis applied to a set of current quality-of-service scores.

3. The computer program product of claim 2 wherein one or more of the current quality-of-service score and the predicted quality-of-service score is associated with one or more of a participant associated with the electronic call and a set of call participants associated with the electronic call.

4. The computer program product of claim 1 wherein the visual indicator includes an alert associated with one or more of a likelihood of call failure and the failover connection.

5. The computer program product of claim 1 wherein one or more of monitoring the one or more characteristics, determining the current quality-of-service score, determining the predicted quality-of-service score, providing the failover connection, and replacing the current connection with the failover connection occur in near real-time.

6. The computer program product of claim 1 wherein providing the failover connection is based upon, at least in part, an input from one or more of a participant associated with the electronic call and a moderator associated with the electronic call, wherein one or more of the participant associated with the electronic call and the moderator associated with the electronic call is prompted for the input during the current connection and prior to failure of the current connection.

7. The computer program product of claim 1 wherein replacing the current connection with the failover connection is based upon, at least in part, an input from one or more of a participant associated with the electronic call and a moderator associated with the electronic call, wherein one or more of the participant associated with the electronic call and the moderator associated with the electronic call is prompted for the input during the current connection and prior to failure of the current connection.

8. A computer system comprising:
at least one processor;
at least one memory architecture coupled with the at least one processor;
a first software module executable by the at least one processor and the at least one memory architecture, wherein the first software module is configured to monitor one or more characteristics of an electronic call;

a second software module executable by the at least one processor and the at least one memory architecture, wherein the second software module is configured to determine a current quality-of-service score based upon, at least in part, the one or more characteristics;

a third software module executable by the at least one processor and the at least one memory architecture, wherein the third software module is configured to store the current quality-of-service score in a storage device as a previously-determined current quality-of-service score;

a fourth software module executable by the at least one processor and the at least one memory architecture, wherein the fourth software module is configured to determine a predicted quality-of-service score based upon, at least in part, one or more of previously-determined current quality-of-service scores, the current quality-of-service score, and the one or more characteristics, wherein the predicted quality-of-service score is associated with one or more future times;

a fifth software module executable by the at least one processor and the at least one memory architecture, wherein the fifth software module is configured to provide to one or more of a participant associated with the electronic call and a moderator associated with the electronic call a visual indicator associated with one or more of a set of current quality-of-service scores, the predicted quality-of-service score, and whether the predicted quality-of-service score falls beneath a threshold quality-of-service score;

a sixth software module executable by the at least one processor and the at least one memory architecture, wherein the sixth software module is configured to provide a failover connection associated with the electronic call; and a seventh software module executable by the at least one processor and the at least one memory architecture, wherein the seventh software module is configured to replace a current connection associated with the electronic call with the failover connection based upon, at least in part, one or more of the predicted quality-of-service score and the threshold quality-of-service score.

9. The computer system of claim 8 wherein determining the predicted quality of service score is based upon, at least in part, one or more of an autoregressive conditional heteroskedasticity analysis and an autoregressive integrated moving average analysis applied to a set of current quality-of-service scores.

10. The computer system of claim 8 wherein one or more of the current quality-of-service score and the predicted quality-of-service score is associated with one or more of a participant associated with the electronic call and a set of call participants associated with the electronic call.

11. The computer system of claim 8 wherein the visual indicator includes an alert associated with one or more of a likelihood of call failure and the failover connection.

12. The computer system of claim 8 wherein one or more of monitoring the one or more characteristics, determining the current quality-of-service score, determining the predicted quality-of-service score, providing the failover connection, and replacing the current connection with the failover connection occur in near real-time.

13. The computer system of claim 8 wherein providing the failover connection is based upon, at least in part, an input from one or more of a participant associated with the electronic call and a moderator associated with the electronic call, wherein one or more of the participant associated with the electronic call and the moderator associated with the electronic call is prompted for the input during the current connection and prior to failure of the current connection.

14. The computer system of claim 8 wherein replacing the current connection with the failover connection is based upon, at least in part, an input from one or more of a participant associated with the electronic call and a moderator associated with the electronic call, wherein one or more of the participant associated with the electronic call and the moderator associated with the electronic call is prompted for the input during the current connection and prior to failure of the current connection.

* * * * *